US010180861B2

(12) United States Patent
Raghavan et al.

(10) Patent No.: US 10,180,861 B2
(45) Date of Patent: Jan. 15, 2019

(54) STREAM SCHEMA RESOLUTION AND STREAM TUPLE PROCESSING IN A DISTRIBUTED STREAM-PROCESSING SYSTEM

(71) Applicant: FAIR ISAAC CORPORATION, San Jose, CA (US)

(72) Inventors: Shalini Raghavan, Minneapolis, MN (US); Tom J. Traughber, Austin, TX (US); George Vanecek, Jr., San Jose, CA (US); Christopher Lee Bedford, Mountain View, CA (US)

(73) Assignee: FAIR ISAAC CORPORATION, Roseville, MN (US)

( * ) Notice: Subject to any disclaimer, the term of this patent is extended or adjusted under 35 U.S.C. 154(b) by 186 days.

(21) Appl. No.: 14/940,094

(22) Filed: Nov. 12, 2015

(65) Prior Publication Data

US 2016/0132360 A1 May 12, 2016

Related U.S. Application Data

(60) Provisional application No. 62/078,333, filed on Nov. 11, 2014.

(51) Int. Cl.
*G06F 9/54* (2006.01)
(52) U.S. Cl.
CPC ...................... *G06F 9/54* (2013.01)
(58) Field of Classification Search
CPC ............................................. G06F 9/46–9/54
See application file for complete search history.

(56) References Cited

U.S. PATENT DOCUMENTS

| 8,863,116 B1 * | 10/2014 | McCarten ............... G06F 9/445 709/203 |
|---|---|---|
| 2003/0152084 A1 | 8/2003 | Lee et al. |
| 2007/0002946 A1 | 1/2007 | Bouton et al. |
| 2007/0214142 A1 | 9/2007 | Goyal et al. |
| 2008/0205314 A1 | 8/2008 | Pecen |

(Continued)

OTHER PUBLICATIONS

IBM InfoSphere Streams Assembling Continuous Insight in the Information Revolution Kevin Foster, Andy Frenkiel, Senthil Nathan, Chuck Ballard et al. p. 17-26, 33-89, 120-125, 139-155, 179-193, 203-275 Published: 2011.*

(Continued)

*Primary Examiner* — Emerson C Puente
*Assistant Examiner* — Paul V Mills
(74) *Attorney, Agent, or Firm* — Mintz Levin Cohn Ferris Glovsky and Popeo, P.C.

(57) ABSTRACT

A task worker running on a worker server receives a process specification over a network. The process specification specifies a task to be executed by the task worker. The executed task includes generating an output data object for an output data stream based in part on an input data object from an input data stream. The process specification is accessed to specify the required fields to be read from for executing the task and to specify the generated the fields in the input data object that will be written to during or subsequent to the executing of the task. The task worker executes the task and generates the output data object. The output data object is then transmitted to the output stream based on the stream configuration.

16 Claims, 10 Drawing Sheets

(56) References Cited

U.S. PATENT DOCUMENTS

2008/0288595 A1* 11/2008 Liu .................. G06Q 10/10
                                                            709/206
2016/0132367 A1    5/2016 Raghavan et al.

OTHER PUBLICATIONS

IBM InfoSphere Streams Accelerating Deployments with Analytic Accelerators Peter Nicholls, Ankit Pasricha, Roger Rea, Chuck Ballard Oliver Brandt et al Preface and Chapter 2 Published: Feb. 2014*
The Design of Stream Database Engine in Concurrent Environment Marcin Gorawski and Aleksander Chroszcz Published: 2009.*
Type Systems for Coordination Languages Haoxuan Cai Published 2012.*

* cited by examiner

STREAM SCHEMA RESOLUTION AND STREAM TUPLE PROCESSING IN A DISTRIBUTED STREAM-PROCESSING SYSTEM

CROSS-REFERENCE TO RELATED APPLICATIONS

The current application is related to/claims priority under 35 U.S.C. § 119(e) to application No. 62/078,333 filed Nov. 11, 2014.

TECHNICAL FIELD

The subject matter described herein relates to the configuration of stream schemas for the exchange of data objects. Specifically, the configuration of stream schemas for data objects used in distributed processing systems.

BACKGROUND

Systems that process large volumes and varying velocities of messages continuously may do so using a stream-processing paradigm that defines the processes as distributed data flow topologies interconnected by streams. These streams move data, for example, messages as data objects representing tuples (information packets that have pre-defined schemas). Schemas can be sets of operations allowed to operate on the data objects or tuples. The systems typically offer an execution environment that requires developers to create their distributed processes as custom topologies written on top of the system's run-time frameworks and APIs. In doing so, the developers need to write custom code for each task in the distributed process and work out the custom stream tuple schemas that interconnect the tasks. Given that users may want to quickly develop new processes for consuming and analyzing continuous streams of data, a more general mechanism is required to remove the need for developers to create new processes, and give enterprises the ability to quickly create complex processes without developing new code.

A system can execute distributed processes created automatically from provided process specifications that utilize reusable tasks with generalized task configurations that allow methods to automatically resolve the interconnecting stream schema. As such, users can orchestrate their processes by generating process specifications in web-based high-level visual editors, and have the system create, deploy and execute the distributed data flow topologies. However, to do so, the users must be assisted 1) in providing the necessary information to the selected tasks and 2) by removing the need for the user to resolve the schemas across interconnected streams.

SUMMARY

In one aspect, a task worker running on a worker server receives a process specification over a network. The process specification specifies a task to be executed by the task worker. The executed task includes generating an output data object for an output data stream based in part on an input data object from an input data stream.

The process specification includes an iteration configuration that specifies required fields in the input data object in order for the task worker to execute the task. Also, the process specification specifies generated fields in the output data object to be written to during execution of the task. The process specification also includes a stream configuration specifying fields required in the input data object or the output data object during transmission of the input data object or the output data object along the input data stream or the output data stream.

The process specification is accessed to specify the required fields to be read for executing the task and to specify the generated the fields in the input data object that will be written to during or subsequent to the executing of the task.

The task worker executes the task and generates the output data object. The task includes reading the required fields from the input data object and writing to the generated fields in the output data object. The output data object is then transmitted to the output stream based on the stream configuration.

In an interrelated aspect, a process specification is generated using a graphical user interface displayed on a client computer. The process specification specifies a task to be executed by the task worker. The executed task includes generating an output data object for an output data stream based in part on an input data object from an input data stream.

The process specification includes an iteration configuration that specifies required fields in the input data object in order for the task worker to execute the task. Also, the process specification specifies generated fields in the output data object to be written to during execution of the task. The process specification also includes a stream configuration specifying fields required in the input data object or the output data object during transmission of the input data object or the output data object along the input data stream or the output data stream.

A user of the client computer selects at least two tasks from a task library and at least one stream connecting the tasks. The connected tasks and streams form a distributed stream process. As tasks and streams are selected, the process specification is changed correspondingly. The distributed stream process is then updated in response to changes in the process specification.

In some variations one or more of the following features can optionally be included in any feasible combination.

A field value can be copied from the input data object prior to the execution of the tasks and stored in a memory. The field value can also be written to the output data object subsequent to the execution of the tasks.

The process specification can include a task configuration having: the iteration configuration, task designations providing an indication of which of the tasks are to be executed, and task parameters specifying parameters required for the tasks.

Prior to execution of the tasks, task libraries can be preloaded from a task importer in the management server to the worker servers and a management server. The tasks can be received by the task worker from the corresponding task library in the worker servers.

Also, a task queue can be generated in memory. Then, all of the tasks specified by the task configuration can be inserted into the task queue. For each of the tasks in the task queue, the input data object can be adapted and modified prior to execution of any of the tasks.

For each of the at least one tasks in the task queue, prior to execution of task and based on the stream configuration, the generated fields in the output data object can be written to.

The stream configuration can also include a user-modifiable field filter column that specifies whether a field in the input data object is to be retained.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The details of one or more variations of the subject matter described herein are set forth in the accompanying drawings.

As used herein, a data object is a general term for a container for tuples. Accordingly, "tuples," as used herein are a generic data object and do not imply any particular type of data object, nor have any inherent or pre-defined properties, unless specifically noted. Tuples are only used to describe data objects moving through the stream processing system described herein. Data objects can include, for example, tuples, files, containers, packages, objects, etc.

In a distributed stream-processing environment, process topologies consist of a set of tasks that are interconnected by streams that move tuples from their upstream tasks to their downstream tasks. As used herein, tasks and task workers can be computer programs or executable code modules that can manipulate tuples or data objects, or transmit/receive tuples or data objects to or from one or more streams. During processing, tasks consume tuples from their input streams and emit tuples to their output streams, where each stream has its own stream schema that defines the fields of the stream's tuples. As used in the application, tuples can include any data packet, object, file, etc. that includes information to be operated on, transmitted, distributed, etc. Also as used in the application, a stream or streams may be a physical stream, e.g. wired or wireless transmission of data, or may be virtual, e.g. movement of tuples in computer memory or changes of state in the tuple objects according to tasks or other prescribed processes or operations.

Figure 1:
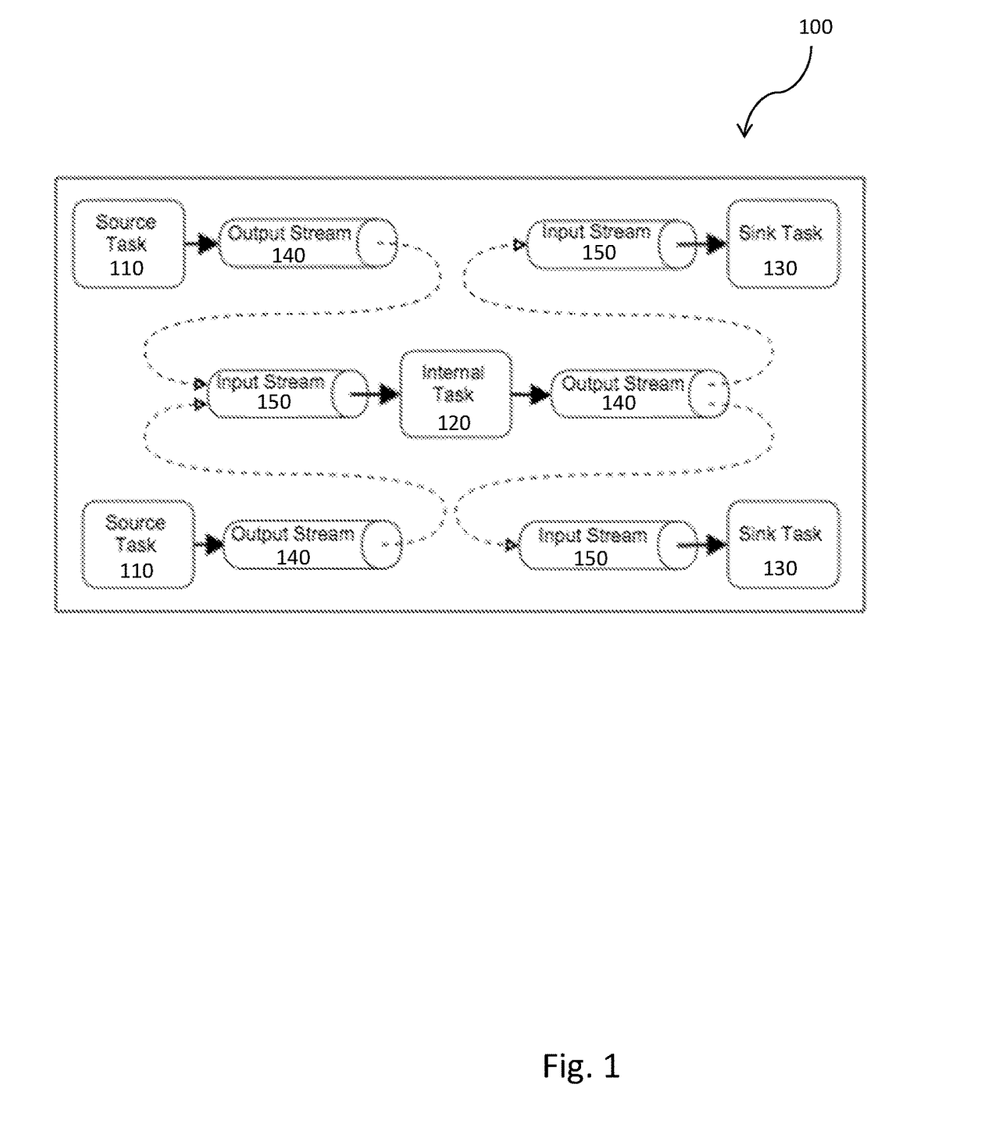
FIG. 1 shows a distributed process with tasks and interconnecting streams.

FIG. 1 shows a distributed process 100 with tasks and interconnecting streams. Tasks can be any operation, procedure, program flow step, etc. that operates on the tuples. A distributed process 100 can include multiple types of tasks, e.g. source tasks 110, internal tasks 120, and sink tasks 130 that perform operations on artifacts within the streams, e.g. tuples. The internal tasks 120 have both output streams 140 and input streams 150. The sink tasks 130 have only the input streams 150, but none of the output streams 140. The source tasks 110 have none of the input streams 150, but have output streams 140. Streams connecting the tasks can include both the output streams 140 and the input streams 150.

Figure 2:
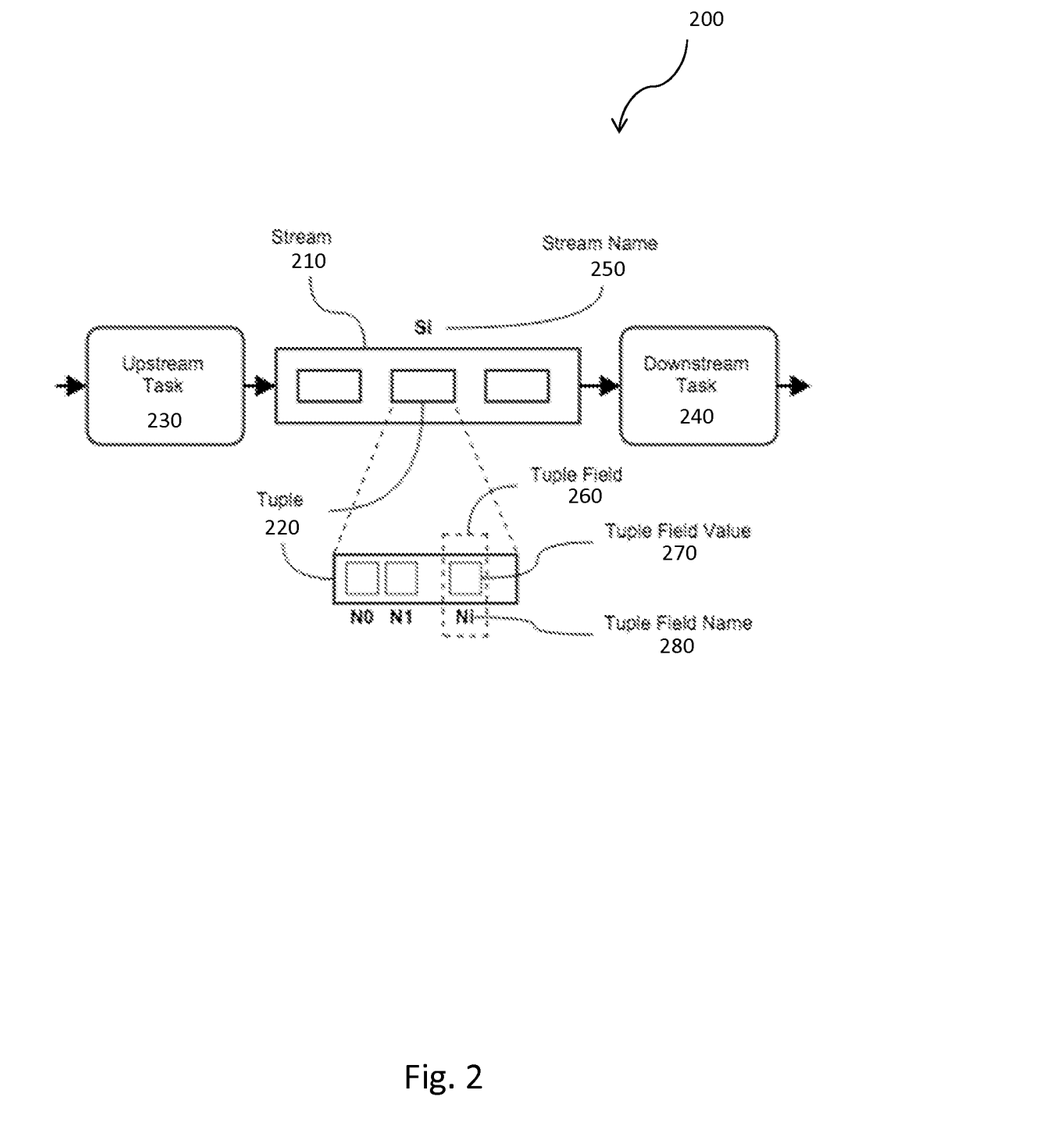
FIG. 2 shows a stream flow diagram stream passing a tuple between an upstream task and a downstream task.

FIG. 2 shows a stream flow diagram 200 stream passing a tuple 220 between an upstream task 230 and a downstream task 240. Note that stream 210 is the same as the output stream 140 for the upstream task 230; and the stream 210 is the same as the input stream 150 for the downstream task 240. Each of the streams 210 can have a stream name 250 that uniquely identifies the stream 210. There can be any number of the streams 210, e.g. 1 . . . N, with a particular stream 210 being indexed by the variable i, thus the $i^{th}$ stream has the name $S_i$. Each tuple 220 can include of a sequence of one or more tuple fields 260. Each of the tuple fields 260 can be defined by a tuple field name 280 and a tuple field value 270. Similar to the streams 210, there may be any number of the tuples 220, where each of the tuples 220 can have any number of the tuple fields 260, the tuple field values 270, and the tuple field names 280. Similar to the streams 210, the tuple field names 280 are shown as $N_0$, $N_1$, . . . $N_i$, etc.

Figure 3:
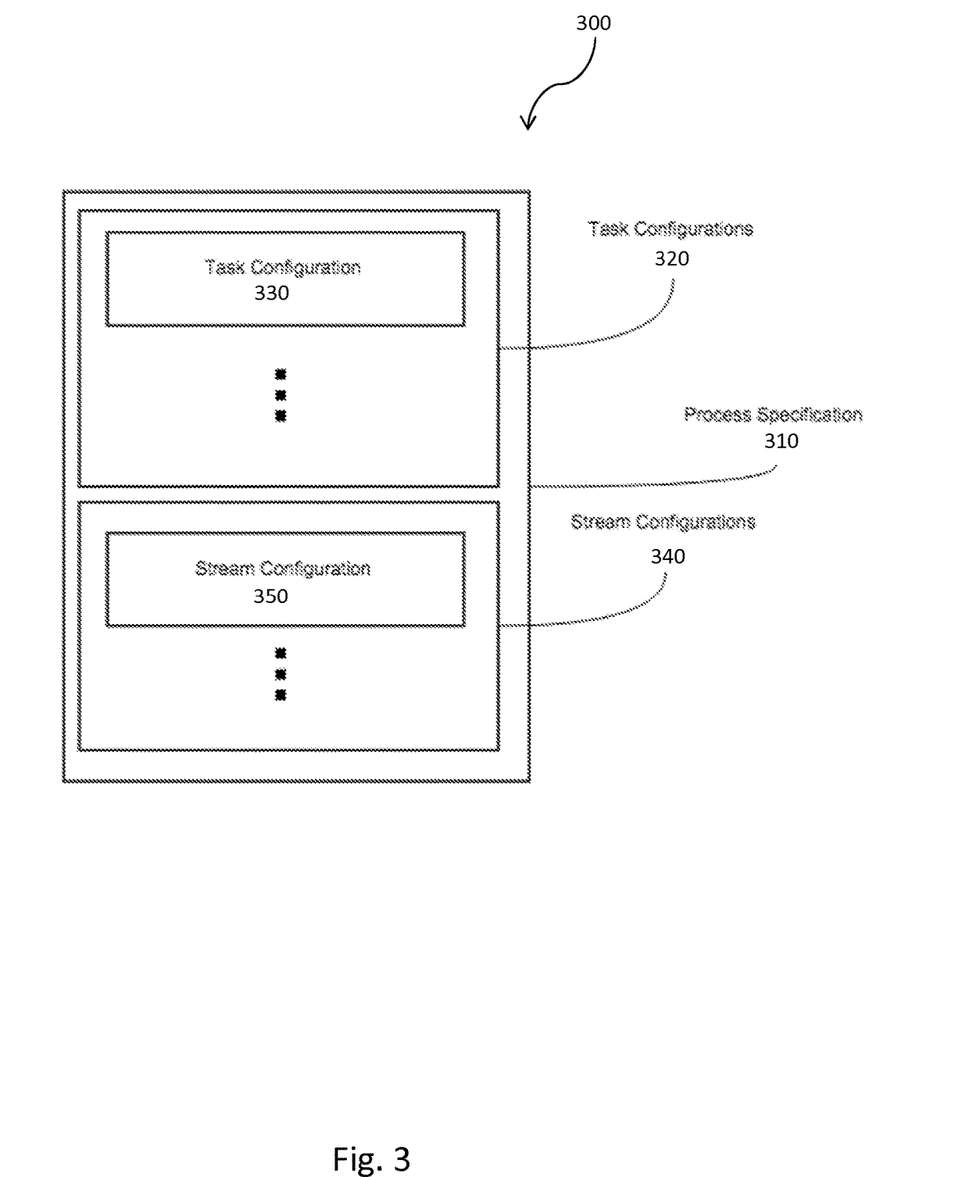
FIG. 3 is a block diagram of a process specification.

FIG. 3 is a block diagram 300 of a process specification 310. The process specification 310 can include a group of task configurations 320 that can include multiple task configurations 330. Similarly, the process specification 310 can include stream configurations 340 that can include multiple stream configurations 350.

Figure 4:
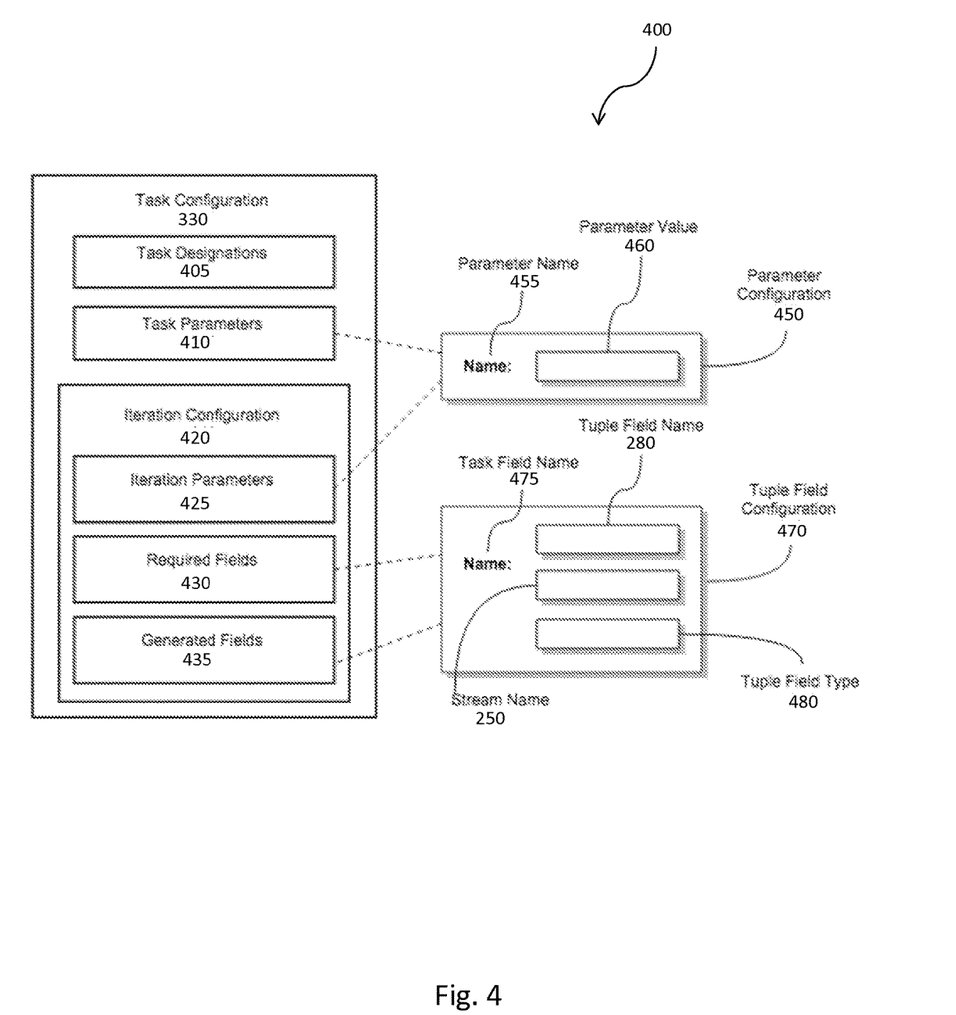
FIG. 4 is a block diagram of a task configuration.

FIG. 4 is a block diagram 400 of a task configuration 330. A task configuration 330 is fixed by its task, but parameterized by the user that is configuring the process specification 310 for execution. In the task configuration 330, task designations 405 contain details about the task that may be referred to by a user. The task designations 405 can include the task name, its origin, version, etc. The task designations 405 can also provide the processing mode, which can determine how the task processes input tuples and generates output tuples. The processing mode can be either a full tuple processing mode or a partial tuple processing mode. The full tuple processing mode and the partial tuple processing mode are described in greater detail in the discussion of FIGS. 8 and 9.

The task configuration 330 can also contain task parameters 410 that offer the user a set of task-required parameters that are independent of any one tuple or field being processed.

The task configuration 330 can contain an iteration configuration 420, which is used by the task to process input tuples and fields and/or generate the output tuples and fields. Input tuples refer to tuples prior to being operated upon by a task, whereas output tuples are the tuples that result of the input tuple having been operated upon by the task. The iteration configuration 420 can contain an iteration parameter 425 used to parameterize the iteration, a required field 430 used to designate one or more input tuple fields, and a generated field 435 generated by the input tuple being operated on by the task. How the iteration configuration 420 is interpreted by a task depends on whether the task is using the full tuple or the partial tuple processing modes. The task parameter 410 and the iteration parameter 425 can both include a parameter configuration 450. The parameter configuration 450 can include the parameter name 455 and the parameter value 460. Similarly, the required field 430, and the generated field 435 can include a tuple field configuration 470. The tuple field configuration 470 can include the task field name 475 which is the task's internal name to be associated with the tuple field name 280, stream name 250, and tuple field type 480. In general, for any one particular task, the specification of iterations, required fields, and generated fields is optional, and depends on the particular functional requirements of the task.

Figure 5:
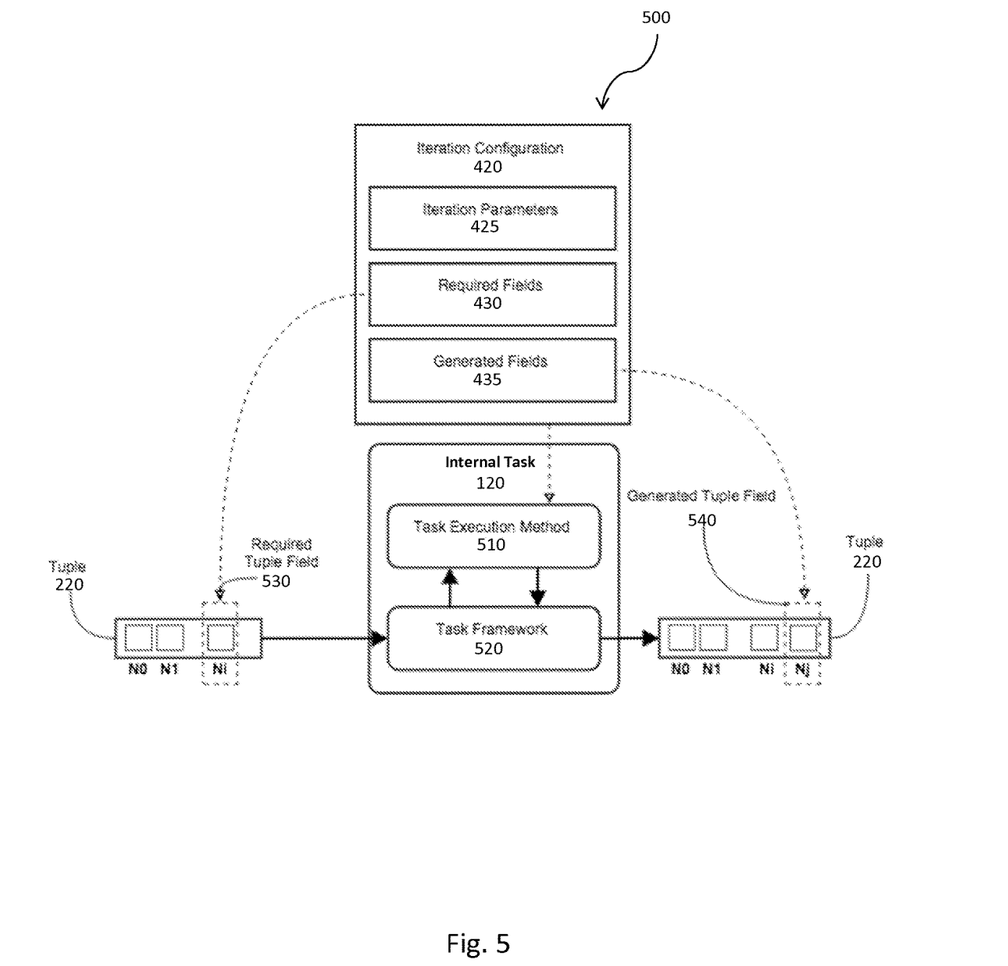
FIG. 5 is a process flow diagram illustrating the internal task creating the generated tuple field.

FIG. 5 is a process flow diagram 500 illustrating the internal task 120 creating the generated tuple field 540. The internal task 120 can have a task execution method 510 and a task framework 520 that can be used by the iteration configuration 420 to create the required tuple fields 530, prior to the tuple 220 being processed by the internal task 120. The iteration configuration 420 can also create the generated tuple fields 540, after the tuple 220 has been processed by the internal task 120.

Figure 6:
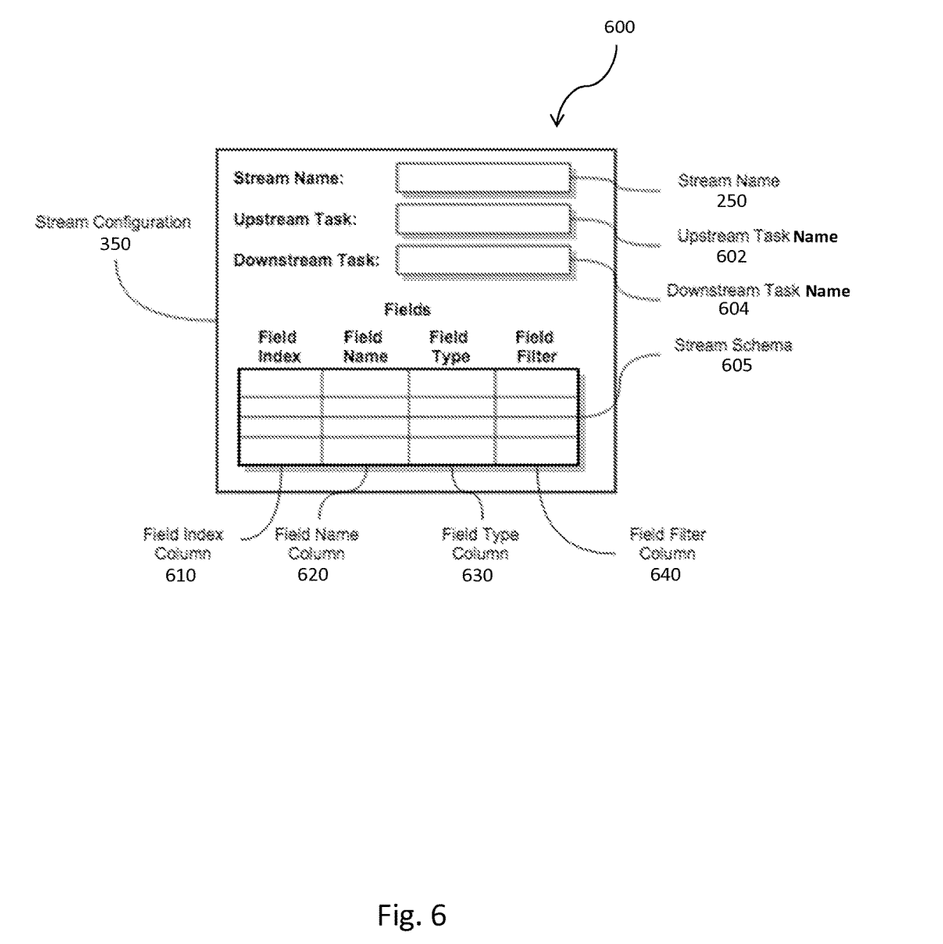
FIG. 6 is a block diagram of a stream configuration.

FIG. 6 is a block diagram 600 of the stream configuration 350. The stream configuration 350 can include the features described above, namely the stream name 250, upstream task name 602, and the downstream task name 604. Also, the stream configuration 350 can include a stream schema 605. The stream schema 605 describes operations that can be performed on tuples 220 within the stream 210. The stream schema 605 can contain additional fields in an array, tabular, etc. format. The additional fields, as shown in the figure in tabular representation, can include a field index column 610, a field name column 620, a field type column 630, and a field filter column 640. The field index column 610 can include index numbers, pointers, or other reference data to identify a particular row with which to specify an operation corresponding to the stream configuration 350. The field name column 620 is similar to the field index column 610, but can be strings, character arrays, etc. that further identify the operation. Unlike the field index column 610, values in the field name column 620 need not be unique and can be more descriptive than the field index column 610. The field type column 630 can provide the data type of the field. The field filter column 640 can provide an indication whether to either keep or drop the tuple field 260 from the tuple 220 before the tuple 220 is delivered by the stream 210 to the downstream task 240. In one implementation, when configuring the process specification, users may only toggle the keep/drop values in the field filter column 640. The other columns are not user modifiable. In other implementations, the other columns can be made to be modifiable or not depending on the application.

Figure 7:
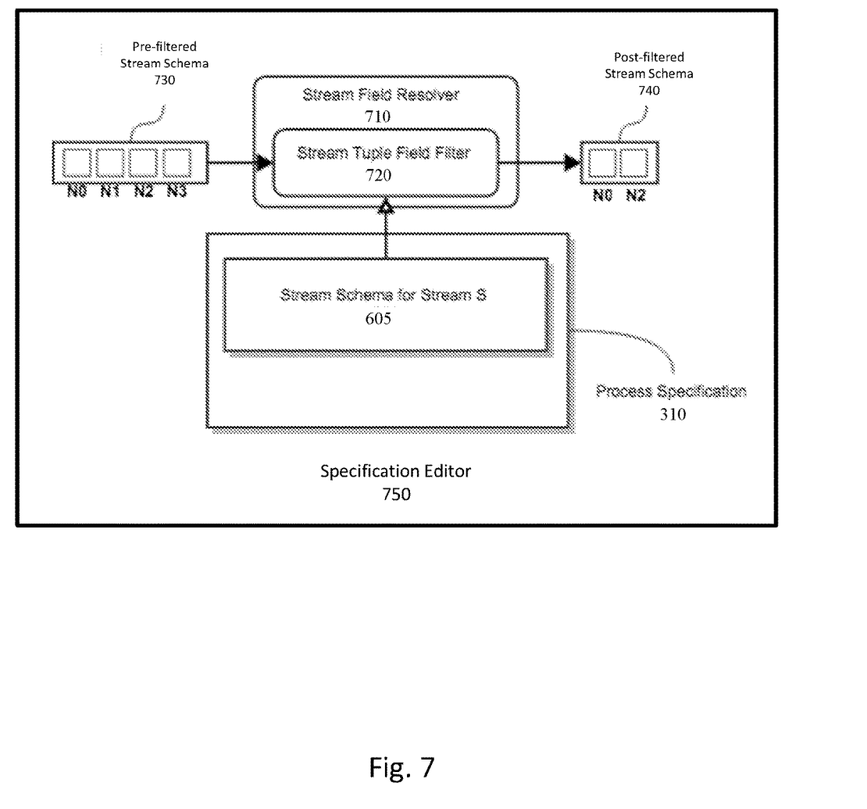
FIG. 7 is a block diagram illustrating creation of a stream schema that can be subsequently applied to the tuple.

FIG. 7 is a block diagram 700 illustrating creation of the stream schema 605 that can be subsequently applied to the tuple 220. The stream field resolver 710 can be responsible for updating the stream schemas (and therefore the process specification 310) after changes are made by a specification editor 750. One example of an operation performed by the stream field resolver 710 is the application of a stream tuple field filter 720. The stream tuple field filter 720 can operate on the pre-filtered stream schema 730 to filter the pre-filtered stream schema 730 to create a post-filtered stream schema 740. The filtering can include adding or removing tuple fields 260 from the stream schema 605. The post-filtered stream schema 740 can then be written to the process specification 310. As shown in the example illustrated in FIG. 7, the pre-filtered stream schema 730 has fields with values $N_0$, $N_1$, $N_2$, and $N_3$ that are input into the stream field resolver 710. The stream tuple field filter 720 takes the pre-filtered stream schema 730 and extracts one or more fields from the pre-filtered stream schema 730 according to the instructions of the stream tuple field filter 720. In this case, fields having $N_1$ and $N_3$ have been removed from the stream schema 605. The resulting stream schema then is the post-filtered stream schema 740. As stated above, there can be one or more operations forming a library of operations within the stream filed resolver 710. In one implementation, the instructions for the operations to apply to the pre-filtered stream schemas 730 can be specified by a process specification 310, acting as a library of one or more stream schemas 605 to apply to the streams 210.

The stream schemas 605 can be specified, at design time, in the process specification 310 by the specification editor 750. The specification editor 750 can be in a graphical user interface displayed on a client computer that allows a user to select tasks from a task library and connect the selected tasks by one or more streams. As tasks are selected and streams connecting the tasks are defined, some of the required fields 430 and generated fields 435 can be automatically established by the specification editor 750 or other connected process. Optionally, the user can specify other generated fields by modifying the iteration configuration 420.

Upon modification of the distributed process defined by the specification editor 750, for example adding/removing streams, tasks, or fields, the changes can be propagated through the distributed process. For example, adding a generated field 435 to the iteration configuration 420 can add the field to all downstream stream schemas. Similarly, filtering out of fields by the stream tuple field filter 720 can remove the field from all downstream schemas.

At any stage of development of the distributed process, or just prior to execution, the specification editor 750 can validate the distributed process to confirm that all stream schemas 605 are resolved. Resolution of the stream schemas 605 in order to generate a consistent distributed process is further described in reference to FIG. 8.

Figure 8:
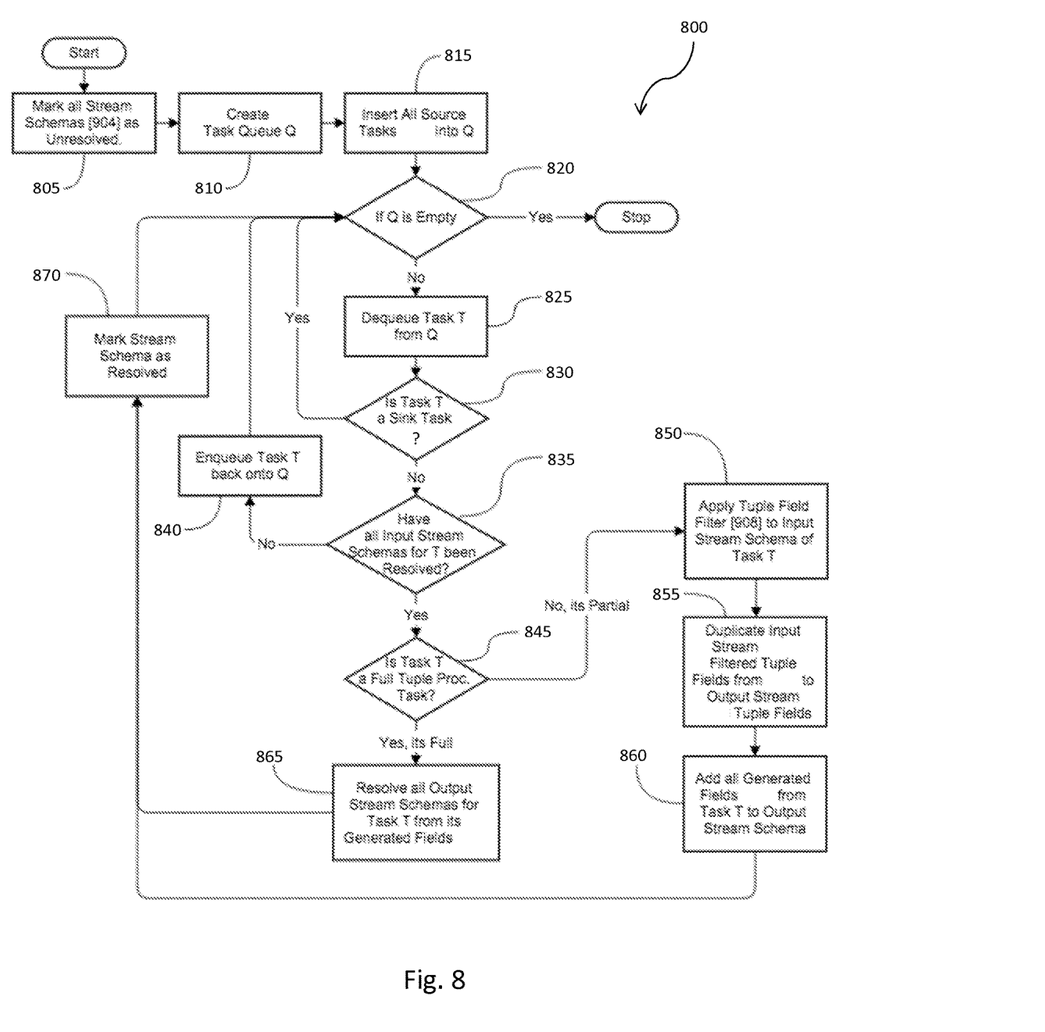
FIG. 8 is a process flow diagram illustrating the resolution of stream schemas.

FIG. 8 is a process flow diagram 800 illustrating the resolution of stream schemas 605. Resolution of stream schemas can include designating the adding, removing, or updating, the fields in a tuple. In 805 all stream schemas 605 are marked as unresolved. This method is applied within a process specification editor whenever a user changes any tuple field 260 related parameters within its tuple field configuration or the field filter settings in the field filter column 640 of its stream configuration 350. The method starts with a given process specification 310 and stops with the same process specification 310 having all its stream schemas 605 resolved. A priority task queue performs a priority-driven breadth-first traversal of the topology graph and iterates over all the tasks until all the tasks have been visited. For each task visited, the task's output streams are resolved and their schemas regenerated.

In 810 a task queue can be created. In 815, all tasks can be inserted into the task queue. At 820 it can be determined if the queue is empty. If so, all stream schemas 605 have been resolved. If the queue is not empty, then at 825 a task can be de-queued from the task queue. If the task is a sink task then there is no action to be taken and the process returns to 820. If the task is not a sink task, then at 835 it can be determined if all input stream schemas for the task are resolved. If not, then at 840 the task can be re-queued back into the task queue for further processing. If so, then at 845 it can be determined if the task is a full processing mode task or a partial processing mode task. The two modes are described in more detail in FIG. 9. If it is a partial processing mode task and at 850 the tuple field filter can be applied to the input stream schema 605 of the task. Then, at 855, the input stream filtered tuple fields from 850 are duplicated and added to the output stream tuple fields. Then at 860, all generated fields can be added from the task to the output stream schema 605. If, at 845, the task was determined to be a full processing mode task, then at 865 all output stream schemas 605 for the task are resolved from the task's generated fields. Then, after either 860 or 865, at 870 the stream schema 605 can be marked as resolved and the queue can be checked again as in 820.

Figure 9:
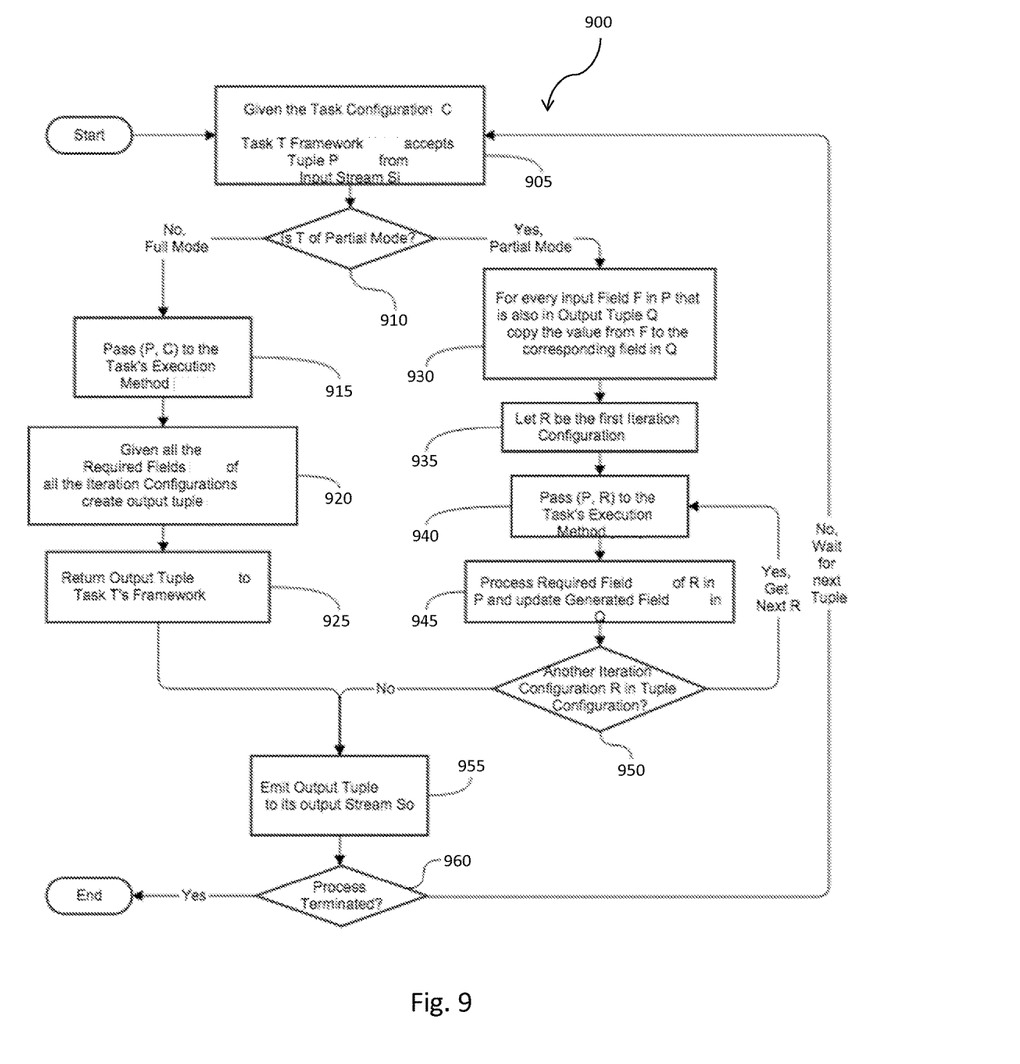
FIG. 9 is a process flow diagram illustrating input tuples being processed by tasks at run-time.

FIG. 9 is a process flow diagram 900 illustrating input tuples being processed by tasks at run-time. In relation to tuple processing modes, the source tasks 110, must only be designed using the full tuple processing mode, as they do not ingest any process streams, unlike sink tasks 130 or the distributed process 100 as a whole. The internal tasks 120 and the sink tasks 130 can be designed as either the partial or full processing mode tasks, although the sink tasks 130 do not emit any streams. Which mode a task uses determines how tuples 220 are passed to the task execution method 510 from the task framework 520. For full tuple processing mode tasks, the task framework executes the task execution method via the branch beginning at 915, while for partial processing mode tasks, the task framework executes the task execution method via the branch beginning at 930.

At 905, given the task configuration 330, the task framework 520 accepts the tuple 220 from the input stream 150. At 910, it is determined if the task is a full processing mode task or a partial processing mode task.

If the task is a full processing mode task, then at 915 the tuple 220 and the task configuration 330 are passed to the task's execution method 510. At 920, given all the required fields 430 of the all the iteration configurations 420, the output tuple 220 is created. At 925, the output tuple is returned to the task's framework 520.

If the task is a partial processing mode task, then at 930, for every input field in the tuple that is also in an output tuple, the value from every input field in the input tuple is copied to the corresponding field in the output tuple. At 935, the iteration configuration 420 is identified. At 935, the iteration configuration 420 and the tuple 220 is passed to the task's execution method 510. At 945, the required fields 430 of the iteration configuration 420 in the tuple 220 are processed and the generated fields 435 in the output tuple are updated. At 950, if there are more of the iteration configurations 420, then 940 repeats to get the next iteration configuration 420.

If there are no more of the iteration configurations 420 to be processed, then at 955 the output tuple is sent to the output stream 150. If there are more tuples 220 in the stream, then return to 905 to wait for the next tuple 220.

Figure 10:
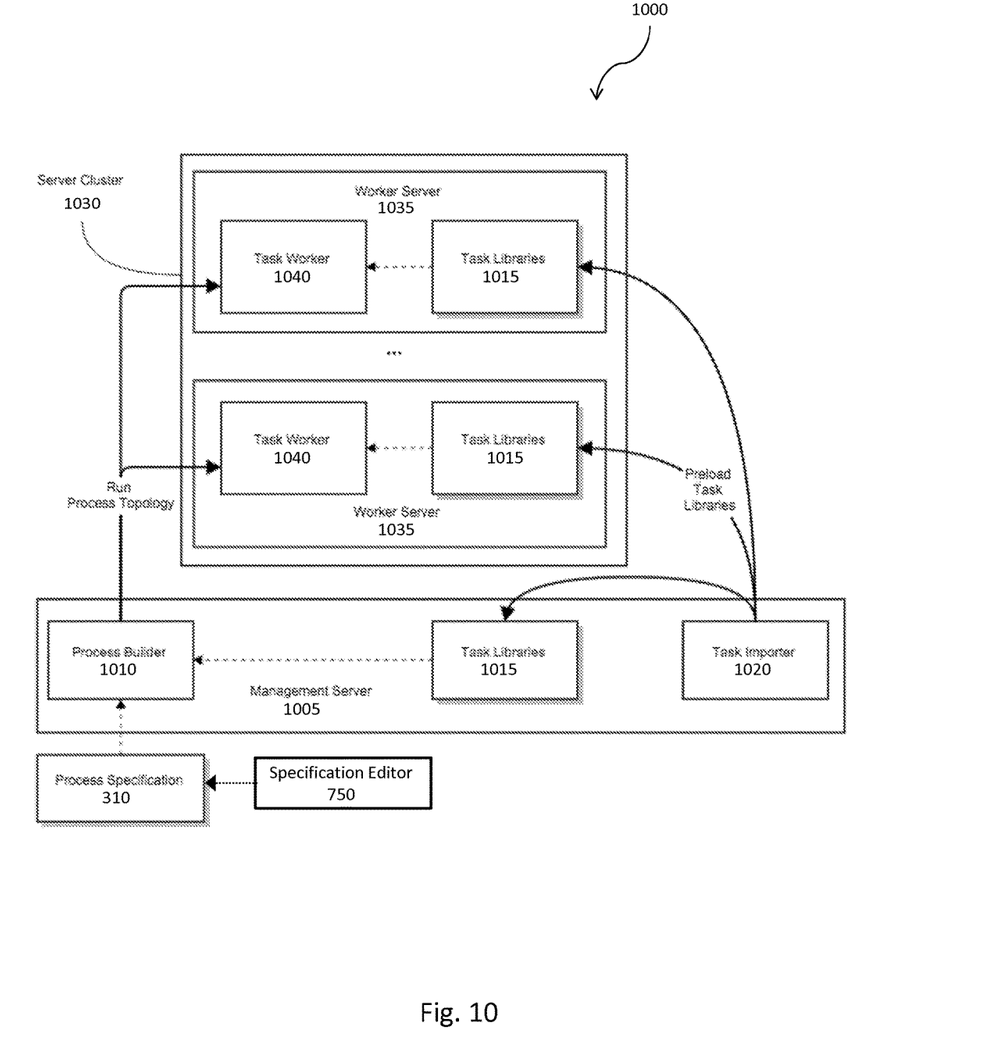
FIG. 10 is a system diagram illustrating the compiling of a process specification on a management server and distributes the resulting compiled process topology to a server cluster.

FIG. 10 is a system diagram 1000 illustrating the compiling of a process specification 310 on a management server 1005 and distributes the resulting compiled process topology to a server cluster 1030. The specification editor 750 can be used to build the process specification 310, which can then be sent to the process builder 1010 at run-time. The management server 1005 can be any number of computers, mainframes, servers, etc. that house a process builder 1010. The process builder 1010 can be a computer program that distributes the task configurations 330 and the stream configurations 350 to the server cluster 1030 to allow parallel or dedicated processing of the associated tasks or stream schemas. The process builder 1010 can access task libraries 1015 that can be imported by a task importer 1020. The task libraries 1015 can contain interchangeable code modules that define tasks to be performed upon the tuples 220. The task importer 1020 can be any program that pulls tasks from a source, e.g. files, databases, other computers, LAN's, the internet, etc. The task importer 1020 can update the task libraries 1015 as additional tasks are created or updated.

The server cluster 1030 can include any number of computers, including worker servers 1040. The worker servers house task workers 1040, which are modular programs that can execute the tasks sent by the process builder 1010. The worker servers 1035 can also house task libraries 1015, similar to the management server 1015. The task libraries 1015 on the worker server 1035 can be preloaded or imported as needed by the task importer 1020. The task libraries 1035 can be accessed by the task workers 1040 in the execution of the distributed tasks.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer-implemented method for configuring a distributed stream process, the method comprising:

displaying, on a graphical user interface on a client computer, an editor allowing a user to configure a process specification of a distributed stream process comprising a plurality of tasks connected by streams for execution by at least one task worker on at least one worker server, wherein the plurality of tasks include one or more internal tasks and executing an internal task by a task worker includes generating an output data object for an output data stream based in part on an input data object from an input data stream, each of the input data object and the output data object comprising a plurality of fields;

configuring, based on user inputs to the editor, portions of the process specification associated with a first task from the one or more internal tasks, the portions including:

an iteration configuration specifying required fields in the input data object for the at least one task worker to execute the first task on the input data object and specifying generated fields in the output data object to be written to during execution of the first; and a stream configuration for the first task's input data stream, wherein the displayed editor for the stream configuration comprises a table including a respective row for each field of the input data object of the first task's input data stream, a first column with an identifier of the field corresponding to the respective row, and a field filter column with a field filter setting corresponding to the identified field, each in field filter setting configured to be directly modified by user input to specify whether the corresponding field in the input data object is to be retained or dropped when generating the output data object;

updating, in a computer memory associated with the client computer and in response to configuring the process specification, the distributed stream process comprising the plurality of tasks and streams; and executing, by the at least one task worker, the first task in accordance with the process specification, the executing comprising processing an input data object received from the first task's input data stream by reading the specified required fields in the received data object and generating an output data object, wherein the generated output data object includes the generated fields specified in the iteration configuration and the fields from the received input data object specified to be retained in the stream configuration, and does not include the fields from the input data object specified to be dropped in the stream configuration.

2. The computer-implemented method of claim 1, wherein each field of the set of required fields specified in the iteration configuration further comprise a field configuration comprising:

a data object field name specifying a name of the required field;

a stream name specifying a name for the input data stream;

a field type specifying a data type of the required fields;
a task field name specifying the first task's internal name associated with the data object field name, the stream name, and the field type.

3. The computer-implemented method of claim 1, further comprising:
preloading task libraries, from a task importer in a management server and prior to execution of the first task, in at least one of the at least one worker server and the management server, wherein a first task library of the preloaded task libraries includes a code module defining the first task; and
receiving, by the at least one task worker, the code module defining the first task from the first task library in the at least one worker server.

4. The computer-implemented method of claim 1, further comprising:
generating a task queue in a memory and inserting all of the plurality of tasks of the process specification into the task queue; and
for each of the at least one tasks in the task queue, updating each output stream configuration for the task only when all stream configurations corresponding to input streams have been updated.

5. The computer-implemented method of claim 1, wherein the portions further include:
a task configuration comprising:
a task designation specifying a task name associated with the first task and specifying either a full processing mode or a partial processing mode for processing input data objects and generating the output data objects by execution of the first task; and
a task parameter required by the first task comprising a parameter configuration.

6. The computer-implemented method of claim 1, further comprising:
copying respective field values from the fields of the received input data object specified to be retained in the stream configuration prior to processing the received input data object; and
writing the copied field values to respective fields of the output data object subsequent to processing the received input data object.

7. A system for configuring a distributed stream process, the system comprising:
a programmable processor; and
a non-transient machine-readable medium storing instructions that, when executed by the processor, cause the at least one programmable processor to perform operations comprising:
displaying, on a graphical user interface of the system, an editor allowing a user to configure a process specification of a distributed stream process comprising a plurality of tasks connected by streams for execution by at least one task worker on at least one worker server, wherein the plurality of tasks include one or more internal tasks and executing an internal task by a task worker includes generating an output data object for an output data stream based in part on the process specification and an input data object from an input data stream, each of the input data object and the output data object comprising a plurality of fields;
configuring, based on user inputs to the editor, portions of the process specification associated with a first task from the one or more internal tasks, the portions including:
an iteration configuration specifying a set of required fields in the input data object for the at least one task worker to execute the first task on the input data object and specifying generated fields in the output data object to be generated during execution of the first task; and
a stream configuration for the first task's input data stream, wherein the displayed editor for the stream configuration comprises a table including a respective row for each field of the input data object of the first task's input data stream, a first column with an identifier of the field corresponding to the respective row, and a field filter column with a field filter setting corresponding to the identified field, each field filter setting configured to be directly modified by user input to specify whether the corresponding field in the input data object is to be retained or dropped when generating the output data object;
updating, in a computer memory associated with the system and in response to configuring the process specification, the distributed stream process comprising the plurality of tasks and streams;
executing, by the at least one task worker, the first task in accordance with the process specification, the executing comprising processing an input data object received from the first task's input data stream by reading the specified required fields in the received input data object and generating an output data object, wherein the generated output data object includes the generated fields specified in the iteration configuration and the fields from the received input data object specified to be retained in the stream configuration, and does not include the fields from the input data object specified to not be retained in the stream configuration; and
transmitting, by the at least one task worker, the generated output data object to the first task's output data stream.

8. The system of claim 7, the operations further comprising:
copying respective field values from the fields of the received input data object specified to be retained in the stream configuration prior to processing the received input data object; and
writing the copied field values to respective fields of the output data object subsequent to processing the received input data object.

9. The system of claim 7, wherein each field of the set of required fields specified in the iteration configuration further comprise a field configuration comprising:
a data object field name specifying a name of the required field;
a stream name specifying a name for the input data stream;
a field type specifying a data type of the required field;
a task field name specifying the first task's internal name associated with the data object field name, the stream name, and the field type.

10. The system of claim 7, further the operations comprising:
preloading task libraries, from a task importer in a management server and prior to execution of the first task, in at least one of the at least one worker server and the management server, wherein a first task library of the preloaded task libraries includes a code module defining the first task; and
receiving, by the at least one task worker, the code module defining the first task from the first task library in the at least one worker server.

11. The system of claim 7, wherein the portions further include:
a task configuration comprising:
a task designation specifying a task name associated with the first task and specifying either a full processing mode or a partial processing mode for processing input data objects and generating the output data objects by execution of the first task; and
a task parameter required by the first task comprising a parameter configuration.

12. A non-transitory machine-readable medium storing instructions that, when executed by a processor of a client computer, cause the processor to perform operations for configuring a distributed stream process, the operations comprising:
displaying, on a graphical user interface on the client computer, an editor allowing a user to configure a process specification of a distributed stream process comprising a plurality of tasks connected by streams for execution by at least one task worker on at least one worker server, wherein the plurality of tasks include one or more internal tasks and executing an internal task by a task worker includes generating an output tuple for an output stream based in part on an input tuple from an input stream, each of the input tuple and the output tuple comprising a plurality of fields;
configuring, based on user inputs to the editor, portions of the process specification associated with a first task from the one or more internal tasks, the portions including:
an iteration configuration specifying required fields in the input tuple for the at least one task worker to execute the first task on the input tuple and specifying generated fields in the output tuple to be written to during execution of the first task; and
a stream configuration for the first task's input stream, wherein the displayed editor for the stream configuration comprises a table including a respective row for each field of the input tuple of the first task's input stream, a first column with an identifier of the field corresponding to the respective row, and a field filter column with a field filter setting corresponding to the identified field, each field filter setting configured to be directly modified by user input to specify whether the corresponding field in the input tuple is to be retained or dropped when generating the output tuple;
updating, in a computer memory associated with the client computer and in response to configuring the process specification, the distributed stream process comprising the plurality of tasks and streams;
executing, by the at least one task worker, the first task in accordance with the process specification, the executing comprising processing an input tuple received from the first task's input stream by reading the specified required fields in the received tuple and generating an output tuple, wherein the generated output tuple includes the generated fields specified in the iteration configuration and the fields from the received input tuple specified to be retained in the stream configuration, and does not include the fields from the input tuple specified to be dropped in the stream configuration; and
transmitting, by the at least one task worker, the generated output tuple to the first task's output stream.

13. The non-transitory machine-readable medium of claim 12, wherein each field of the set of required fields specified in the iteration configuration further comprise a field configuration comprising:
a tuple field name specifying a name of the required field;
a stream name specifying a name for the input stream;
a field type specifying a data type of the required field;
a task field name specifying the first task's internal name associated with the tuple field name, the stream name, and the field type.

14. The non-transitory machine-readable medium of claim 12, the operations further comprising:
preloading task libraries, from a task importer in a management server and prior to execution of the first task, in at least one of the at least one worker server and the management server, wherein a first task library of the preloaded task libraries includes a code module defining the first task; and
receiving, by the at least one task worker, the code module defining the first task from the first task library in the at least one worker server.

15. The non-transitory machine-readable medium of claim 12, the operations further comprising:
copying respective field values from the fields of the received input tuple specified to be retained in the stream configuration prior to processing the received input tuple; and
writing the copied field values to respective fields of the output tuple subsequent to processing the received input tuple.

16. The non-transitory machine-readable medium of claim 12, wherein the portions further include:
a task configuration comprising:
a task designation specifying a task name associated with the first task and specifying either a full processing mode or a partial processing mode for processing input tuples and generating the output tuples by execution of the first task; and
a task parameter required by the first task comprising a parameter configuration.

* * * * *